(12) United States Patent
Lee et al.

(10) Patent No.: US 6,538,784 B1
(45) Date of Patent: Mar. 25, 2003

(54) MULTICAST-CAPABLE OPTICAL CROSS-CONNECT WITH LAYERED MODULARITY

(75) Inventors: Chang Hee Lee, Taejon (KR); Yun Chur Chung, Taejon (KR); Hyun Deok Kim, Taegu (KR)

(73) Assignee: Korea Advanced Institute, Science and Technology, Taejon (KR)

( * ) Notice: Subject to any disclaimer, the term of this patent is extended or adjusted under 35 U.S.C. 154(b) by 0 days.

(21) Appl. No.: 09/387,527

(22) Filed: Sep. 1, 1999

(30) Foreign Application Priority Data

Sep. 1, 1998 (KR) .......................................... 98-035810

(51) Int. Cl.[7] .............................................. H04J 14/02
(52) U.S. Cl. ........................ 359/128; 359/130; 359/117
(58) Field of Search ................................ 359/117, 128, 359/139, 127, 123, 130

(56) References Cited

U.S. PATENT DOCUMENTS

| | | | | |
|---|---|---|---|---|
| 5,446,809 A | * | 8/1995 | Fritz et al. ..................... | 385/17 |
| 5,627,925 A | | 5/1997 | Alferness et al. ........... | 359/124 |
| 5,889,600 A | * | 3/1999 | McGuire .................... | 359/128 |
| 5,937,117 A | * | 8/1999 | Ishida et al. ................. | 385/24 |

OTHER PUBLICATIONS

IEEE Journal of Lightwave Technology, vol. 14, No. 6, Jun. 1996, pp. 1410–1422, Satoru Okamoto, Atsushi Watanabe, and Ken–Ichi Sato, "Optical Path Cross–connect Node Architectures for Photonic Transport network".

IEEE Journal of Lightwave Technology, vol. 14, No. 10, Oct. 1996, pp. 2184–2196, Eugenio Iannone and Roberto Sabella, "Optical Path Technologies: A Comparison Among Different Cross–Connect Architectures".

* cited by examiner

Primary Examiner—Leslie Pascal
Assistant Examiner—Christina Y Leung
(74) Attorney, Agent, or Firm—Graybeal Jackson Haley LLP

(57) ABSTRACT

This invention relates to a multicast-capable optical cross-connect with layered modularity. Due to its layered modularity, this invention can be applied to many differently structured networks and provides easier maintenance than conventional optical cross-connects and efficient preparation for network evolution or node upgrade. By exploiting its simple elementary switches, multicast-capable optical cross-connect with layered modularity minimizes the switching time. For a given node, M input fiber ports supply multiplexed optical signals from other nodes in the network and m input fiber ports supply multiplexed optical signals generated from the node. M+m 1×M optical power splitters 311, 312, 313, 314, 315 distribute multiplexed input signals. A drop link module 331 selects signals to be dropped at the node where the optical cross-connect is installed. M transmission link modules 321, 322, 323 select signals to be transmitted to other nodes out of input signals.

20 Claims, 12 Drawing Sheets

MULTICAST-CAPABLE OPTICAL CROSS-CONNECT WITH LAYERED MODULARITY

BACKGROUND OF THE INVENTION

1. Field of the Invention

The present invention relates to an optical cross-connect used in optical network and more particularly to a multicast-capable optical cross-connect with layered modularity.

2. Description of the Conventional Art

An optical network is composed of several nodes and optical fiber transmission links deployed between the nodes. Each node is equipped with an optical cross-connect and a plurality of monitoring and controlling devices. In optical networks, based on wavelength division multiplexing technology, a particular wavelength is allocated to respective links between the nodes in the network to establish an optical communication path.

For example, let's suppose an optical network with 6 nodes as shown in FIG. 1 and 8 wavelengths, from $\lambda_1$ to $\lambda_8$, are available in the network. Then, the communication paths between the nodes are established as follows. $\lambda_1$ and $\lambda_2$ are allocated for connection between node 1 and node 2. $\lambda_3$ is allocated for connection between node 1 and node 3. $\lambda_4$ is allocated for connection between node 1 and node 4. $\lambda_5$ is allocated for connection between node 1 and node 5. $\lambda_6$ is allocated for connection between node 1 and node 6. $\lambda_4$ is allocated for connection between node 2 and node 3. $\lambda_3$ is allocated for connection between node 2 and node 4. $\lambda_7$ is allocated for connection between node 2 and node 5. $\lambda_8$ is allocated for connection between node 2 and node 6. The same wavelength is used for both sending and receiving signals in a node of the network. To promote efficiency, $\lambda_3$ used for connection between node 1 and node 3 is to be used again for connection between node 2 and node 4 and $\lambda_4$ used for connection between node 1 and node 4 is to be used again for connection between node 2 and node 3.

In optical network, optical cross-connect is installed at each node to control connectivity of optical paths between the nodes by means of wavelength routing as stated above. It drops signals whose destination node is the node where it is installed, provides optical paths to signals whose destination nodes are other nodes in the network, and adds signals generated by the node where it is installed.

For example, an optical cross-connect installed at node 1 provides optical paths for signals of $\lambda_4$ and $\lambda_3$ transmitted from node 2 to node 3 and node 4, respectively, and signals of $\lambda_4$, $\lambda_3$, $\lambda_7$, $\lambda_8$, from node 3, 4, 5, 6 to node 2. In addition, it drops signals of $\lambda_1$ and $\lambda_2$ transmitted from node 2 and signals of $\lambda_3$, $\lambda_4$, $\lambda_5$, and $\lambda_6$ transmitted from node 3, 4, 5, 6, respectively. It adds and provides optical paths for signals of $\lambda_1$ and $\lambda_2$ to node 2 and signal of $\lambda_3$, $\lambda_4$, $\lambda_5$, and $\lambda_6$ to node 3, 4, 5, and 6, respectively.

In FIG. 2, a conventional optical cross-connect that performs wavelength routing function in the network as stated above in accordance with previous invention is illustrated. This cross-connect has M−1 input fiber ports and M−1 output fiber ports. Each of them conveys N wavelength multiplexed signals of $\lambda_1$~$\lambda_N$. M−1 input fiber ports receive multiplexed signals and supply them to demultiplexers 111, 112, 113.

Demultiplexed signals are supplied to one of N space switches 121, 122, 123, 124 as their wavelength and then N space switches establish optical paths for each signals. Added signals ($S_{add}$) are supplied to N space switches and N space switches establish optical paths for them.

Output signals of space switches are supplied to M−1 multiplexers and signals to be dropped ($S_{drop}$) are dropped.

Since conventional cross-connect employs a few elements such as demultiplexers, M×M space switches, and multiplexers for corresponding functions like demultiplexing, routing, and multiplexing, its internal structure is fairly simple and clear. However, it has several drawbacks.

First, as the scale and capacity of the network increase, the number of fiber connected to the node in the network also increases. The size of multi-port space switches 121 to 124 in previously developed cross-connect depends upon the number of fiber ports connected to the node. Thus, as the scale and capacity of the network increase, switching time for establishing optical paths and insertion loss of the space switch increase. As a result, the previously developed cross-connect restricts scalability of the network.

Second, previously developed cross-connect causes difficulties in network evolution, node upgrade and maintenance because of its low modularity. As the network expands and thus the number of optical fiber ports in the cross-connect to be increase, whole node structure should be changed to accommodate such changes. In addition, if some parts of an M×M space switch are not operating properly, the whole space switch module should be replaced. Thus, in order to fix some troubled parts of the cross-connect, whole network services should be down, including services that have nothing to do with the troubled parts of system.

Third, so as to guarantee the quality of signals above certain level, quality difference of signals like power inequality should be compensated. For doing this, devices like variable attenuator will be added to the input or output terminal of the switches. As a result, implementation of optical cross-connect becomes more expensive and its internal structure and control get complicated.

Fourth, in previously developed cross-connects, each input signals can be delivered to only one output fiber port and the number signals added or dropped is restricted to N at maximum. Therefore, it is not suitable for the node that requires flexible connectivity like multicasting.

By reasons stated above, previously developed cross-connects limits network scalability, causes difficulties in preparation for network evolution, node upgrade, and maintenance, and restricts its application to various network structures.

REFERENCES

1. U.S. Patent Documents

U.S. Pat. No. 5,627,925, May, 6, 1997, Non-blocking optical cross-connect structure for telecommunications network.

2. Other Publications

IEEE Journal of Lightwave Technology, Vol. 14, No. 6, June 1996, pp. 1410~1422, Satoru Okamoto, Atsushi Watanabe, and Ken-Ichi Sato, "Optical Path Cross-connect Node Architectures for Photonic Transport Network".

IEEE Journal of Lightwave Technology, Vol. 14, No. 10, October 1996, pp. 2184~2196, Eugenio Iannone and Roberto Sabella, "Optical Path Technologies: A Comparison Among Different Cross-Connect Architectures".

SUMMARY OF THE INVENTION

The present invention provides an optical cross-connect that offers convenience for maintenance, network evolution, and node upgrade thanks to its layered modularity.

It provides capability of multicasting input signals to output fiber ports, adaptability to diverse networks that have different topologies. By employing simple elementary switches, control of optical cross-connect is simplified and switching time is minimized.

An optical cross-connect system for establishing connections between M+m input fiber ports 2M and output fiber ports comprises M+m 1×M optical power splitters, a drop link module, and M transmission link modules. The optical power splitters are connected to the input fiber ports and distribute input signals. The drop link module selects signals to be dropped at the node where the optical cross-connect is installed. The M transmission link modules select signals to be transmitted to a particular output fiber port among input signals.

BRIEF DESCRIPTION OF THE DRAWINGS

FIG. 5b is the first embodiment of the path module illustrated in FIG. 5a.

FIG. 5c is the second embodiment of the path module illustrated in FIG. 5a.

FIG. 5d is the third embodiment of the path module illustrated in FIG. 5a.

FIG. 6b is the first embodiment of the path module illustrated in FIG. 6a.

FIG. 6c is the second embodiment of the path module illustrated in FIG. 6a.

FIG. 6d is the third embodiment of the path module illustrated in FIG. 6a.

FIG. 6e is the fourth embodiment of the path module illustrated in FIG. 6a.

FIG. 7b is the first embodiment of the path module illustrated in FIG. 7a.

FIG. 7c is the second embodiment of the path module illustrated in FIG. 7a.

FIG. 7d is the third embodiment of the path module illustrated in FIG. 7a.

FIG. 7e is the fourth embodiment of the path module illustrated in FIG. 7a.

FIG. 7f is the fifth embodiment of the path module illustrated in FIG. 7a.

FIG. 7g is the sixth embodiment of the path module illustrated in FIG. 7a.

FIG. 8b is the first embodiment of the path module illustrated in FIG. 8a.

FIG. 8c is the second embodiment of the path module illustrated in FIG. 8a.

FIG. 8d is the third embodiment of the path module illustrated in FIG. 8a.

DETAILED DESCRIPTION OF THE PREFERRED EMBODIMENTS

The embodiments of the present invention will be explained with reference to the accompanying drawings.

A multicast-capable optical cross-connect system with layered modularity comprising:

M+m input fiber ports and 2M output fiber ports, each fiber ports carrying wavelength division multiplexed optical signals;

M+m 1×M optical power splitters, each optical power splitter coupled to one of M+m said optical input fiber ports and distributing input signals;

one drop link module, link module selecting signals to be dropped at the node where said optical cross-connect is installed; and M transmission link modules, each transmission link module selecting signals to be transmitted a particular node out of input signals.

Figure 3:
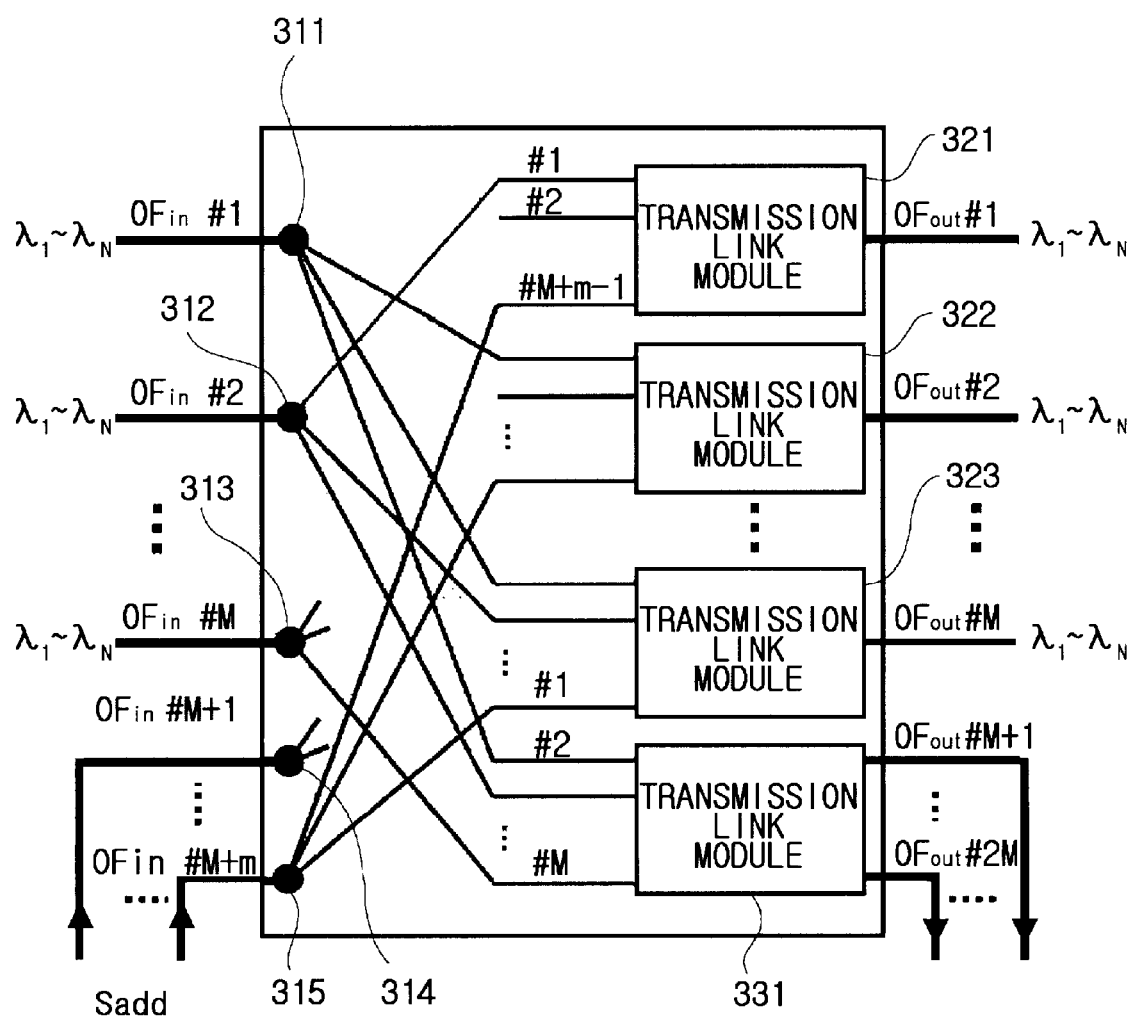
FIG. 3 is a block diagram depicting an embodiment of the multicast-capable optical cross-connect with layered modularity in accordance with the present invention.
Figure 4A:
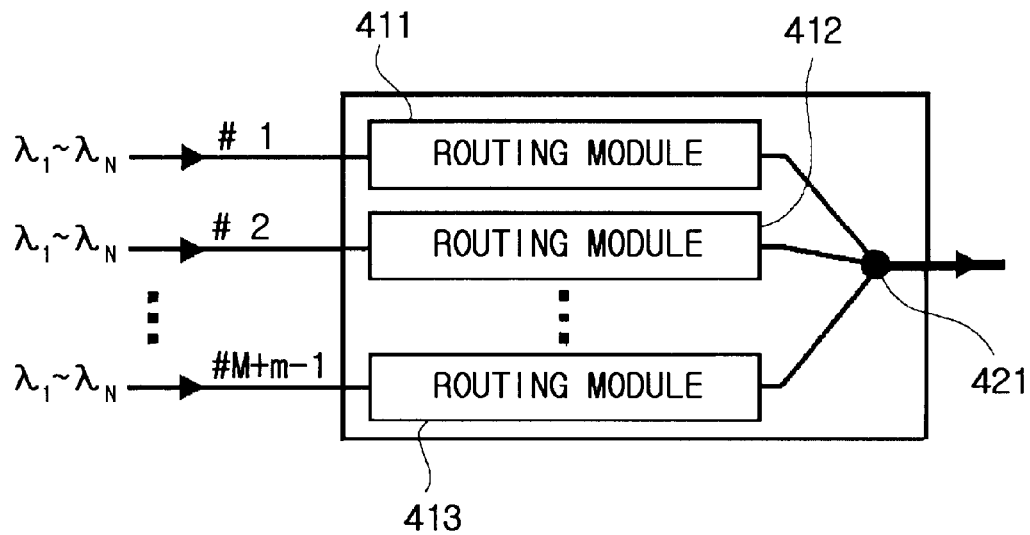
FIG. 4a is a block diagram depicting internal structure of the transmission link module illustrated in FIG. 3.
Figure 4B:
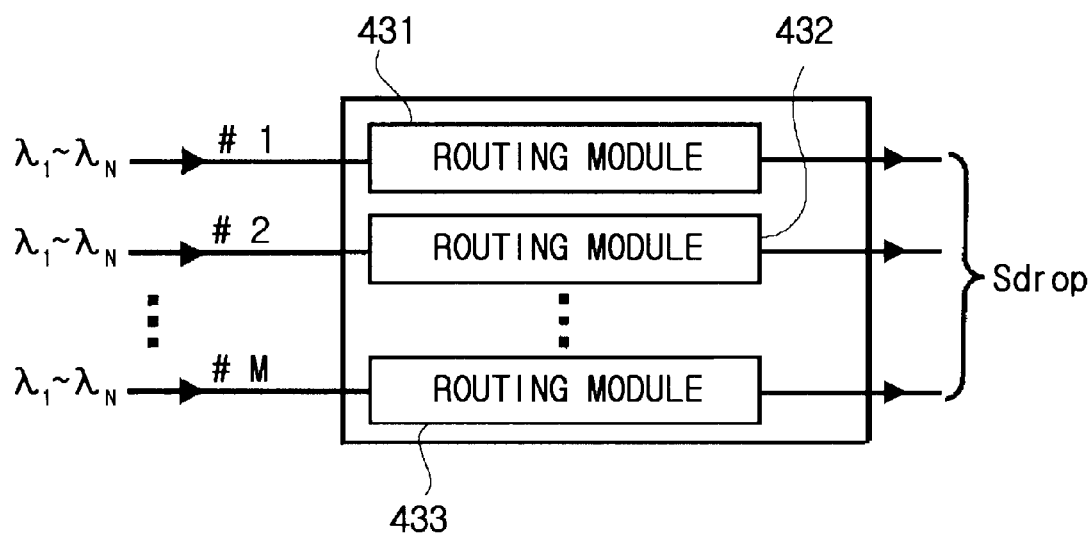
FIG. 4b is a block diagram depicting internal structure of the drop link module illustrated in FIG. 3.
Figure 5A:
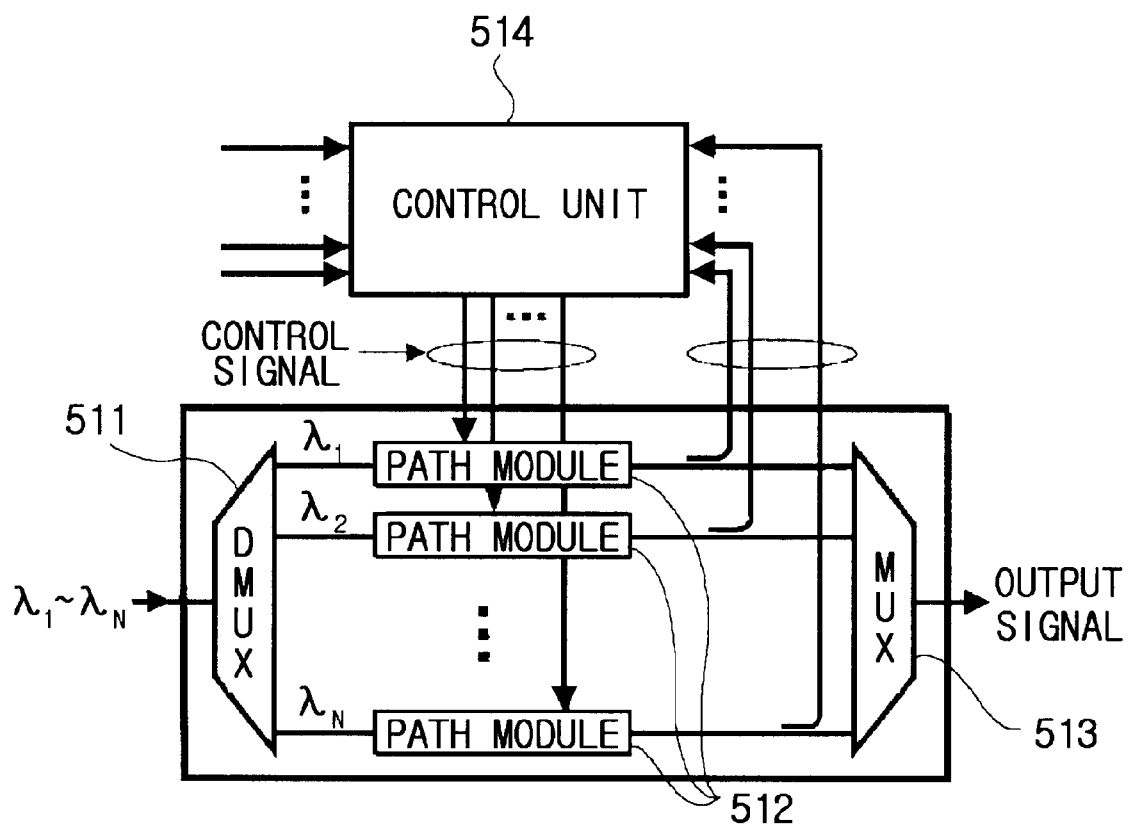
FIG. 5a is the first embodiment of the routing module illustrated in FIG. 4a and 4b.

FIG. 3 is a block diagram depicting an embodiment of the multicast-capable optical cross-connect with layered modularity in accordance with the present invention. FIG. 4a is a block diagram depicting internal structure of the transmission link module illustrated in FIG. 3 and FIG. 4b is a block diagram depicting internal structure of the drop link module illustrated in FIG. 3. FIG. 5a is the first embodiment of the routing module illustrated in FIGS. 4a and 4b and FIGS. 5b, 5c, and 5d are embodiments of the path module illustrated in FIG. 5a.

Multicast-capable optical cross-connect with layered modularity has M+m input fiber ports ($OF_{in}$#1~$OF_{in}$#M+m) and 2M output fiber ports ($OF_{out}$#1~$OF_{out}$#2M) as shown in FIG. 3. It is composed of M+m 1×M optical power splitters 311,312,313,314,315, M transmission link modules 321, 322,323 and a drop link module 331.

M input fiber ports are for signals received from other nodes and m input fiber ports are for added signals. The number of fiber ports for added signals m equals to the maximum number of added signals with the same wavelength. Thus, it is 1, when the wavelength of each added signal is different.

Among 2M output fiber ports, M output fiber ports are for signals to be dropped and the other M output fiber ports are for signal transmitted to other nodes in the network.

M+m 1×M optical power splitters 311,312,313,314,315 are coupled to M+m ($OF_{in}$#1 $OF_{in}$#M+m) input fiber ports. They distribute input signals to link modules 321,322,323, 331.

Transmission link modules 321,322,323 have M+m−1 inlets at maximum and 1 outlet. They select signals to be transmitted to other nodes and send them out to outlet.

The reason that at most M−1 input fiber ports out of M input fiber ports are connected to transmission link modules through optical power splitters is that signals don't need to return theirs source node. For example, signals received from node 3 in FIG. 1 don't need to be sent to the node 3 again. Drop link module 331 has M inlets that connected to M input fiber ports ($OF_{in}$#1~$OF_{in}$#M) through optical power splitters 311, 312, 313 and M outlets connected to output fiber ports ($OF_{out}$#M+1~$OF_{out}$#2M). It selects signals to be dropped from inputs and sends selected signals to M outlets.

As shown in FIG. 4a, transmission link module 321, 322, 323 is composed of M+m−1 routing modules 411, 412, 413 that select signals to be transmitted to output fiber ports and a (M+m−1)×1 optical power combiner 421 that multiplexes selected signals. As shown in FIG. 4b, drop link module 331 is composed of M routing modules 431, 432, 433 that select signals to be dropped out of wavelength division multiplexed input signals.

As shown in FIG. 5a, routing module 411, 412, 413, 431, 432, 433 is composed of 1×N demultiplexer 511, N path modules 512 that control flow of demultiplexed signals, N×1 multiplexer 513, and control unit 514 that controls operation of path modules 512.

Figure 5B:
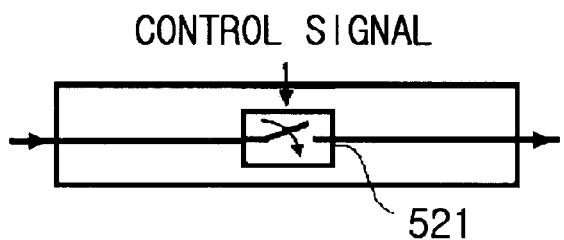
Figure 5C:
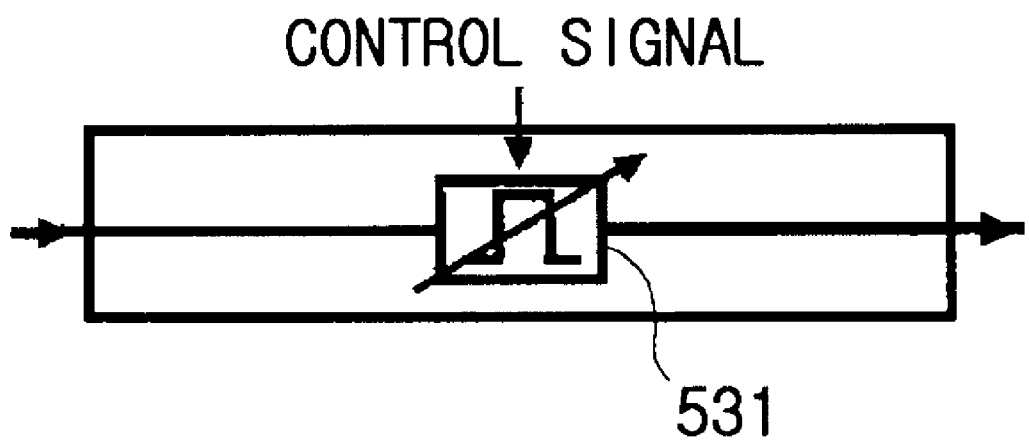
Figure 5D:
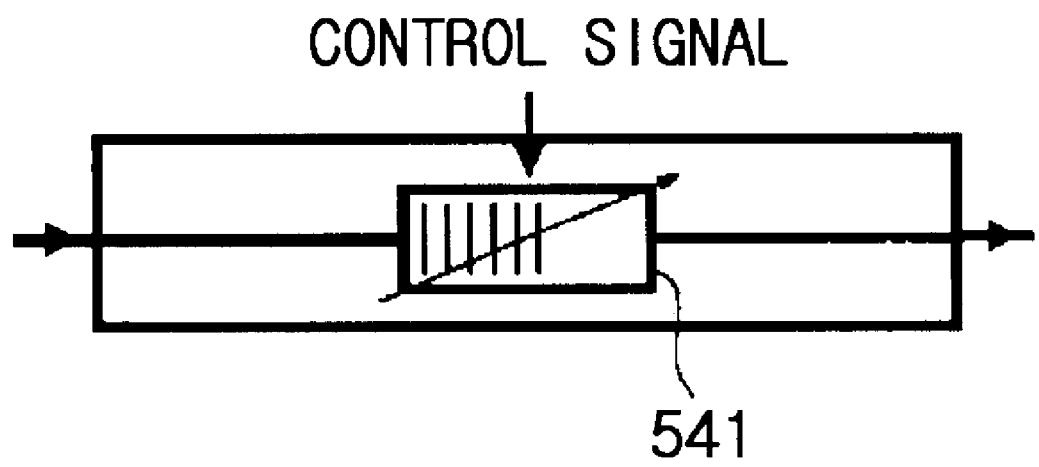

Path module 512, as shown in FIG. 5b, is an on/off optical switch 521 that is controlled by control signal generated by control unit 514. On/off optical switch can be realized by an opto-mechanical switch or a waveguide switch. It also can be realized by semiconductor optical amplifier or fiber amplifier with pump power modulation. As shown in FIG. 5c, path module 512 can be implemented by a tunable filter 531 whose transmission band can be tuned by control signal. As shown in FIG. 5d, path module 512 can be implemented by a tunable fiber grating 541 whose reflection band can be tuned by control signal.

The operation of multicast-capable optical cross-connect with layered modularity according to present invention will be described below.

Wavelength division multiplexed input signals of $\lambda_1 \sim \lambda_N$ delivered to optical cross-connect from other nodes through M input fiber ports are distributed to transmission link modules 321, 322, 323 and drop link module 331 via optical power splitters 311, 312, 313. Wavelength division multiplexed added signals through m input fiber ports are distributed to transmission link modules 321, 322, 323 via optical power splitters 314, 315.

Transmission link modules 321, 322, 323 select signals to be transmitted to a particular node out of input wavelength division multiplexed signals and send out them to the particular node through output fiber ports.

Figure 1:
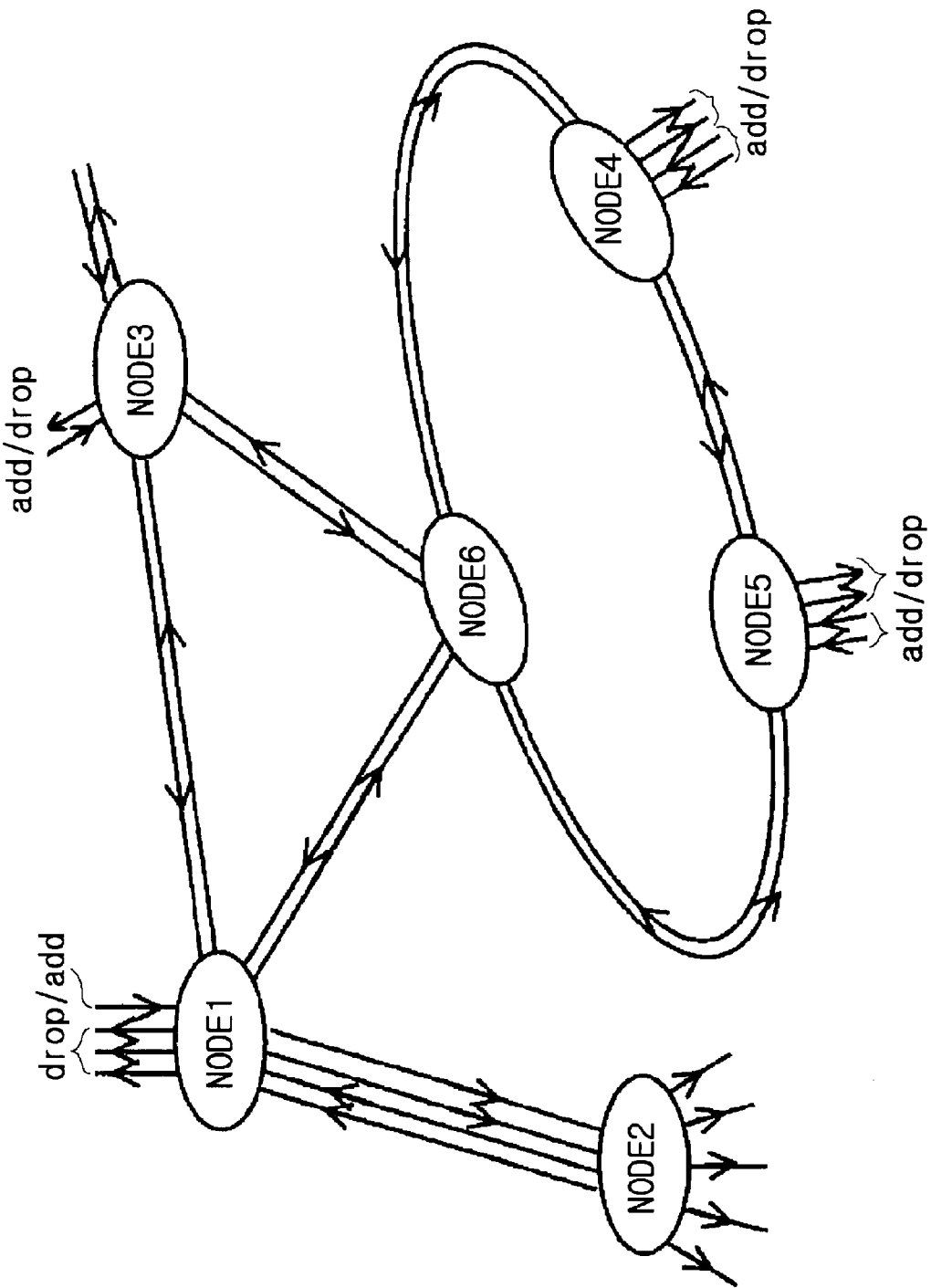
FIG. 1 is a diagram depicting a conventional optical network.
Figure 2:
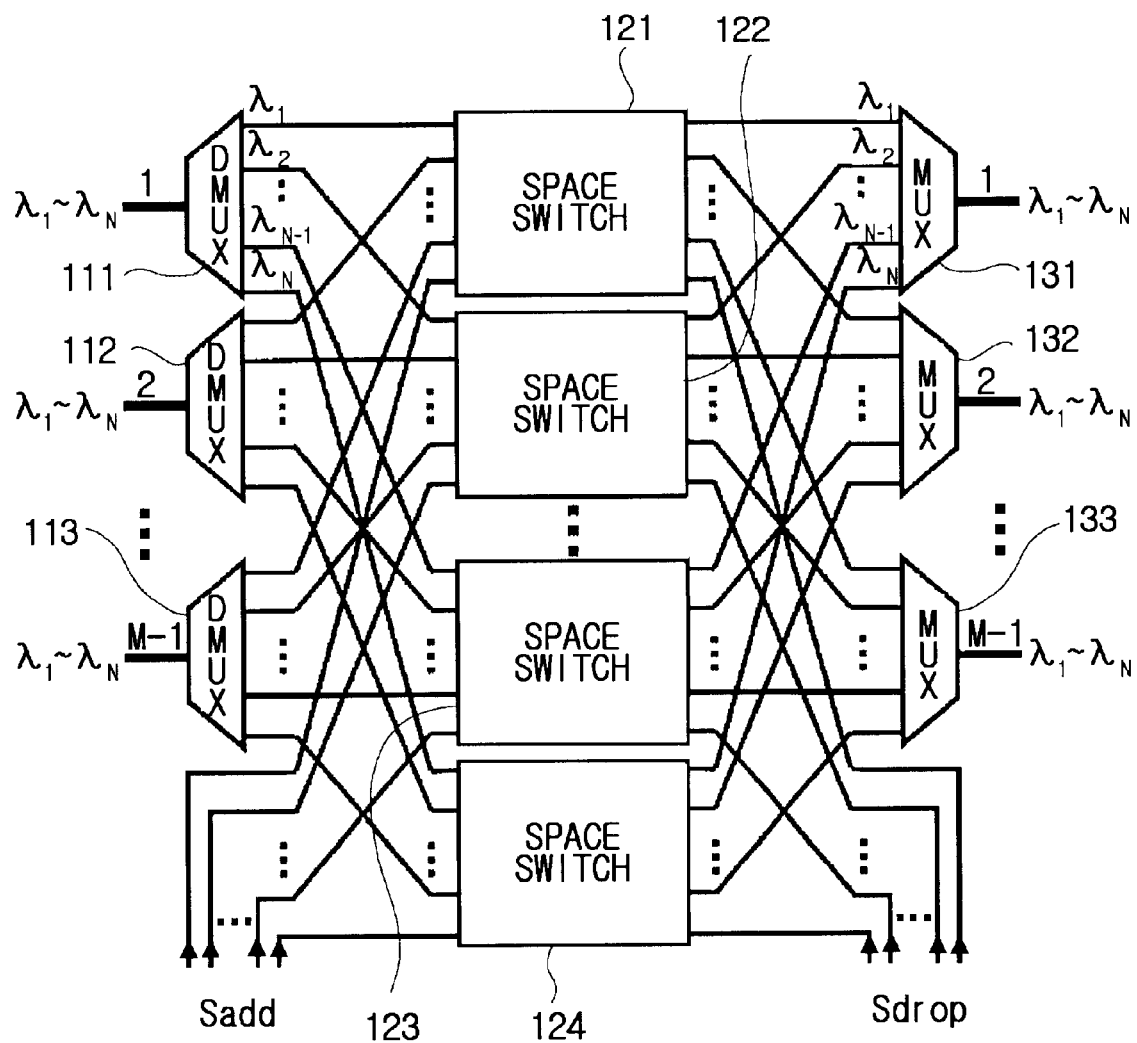
FIG. 2 is a block diagram depicting a previously proposed optical cross-connect.

For example, let's suppose that cross-connect is installed at node 1 and node 1 is connected to other nodes as shown in FIG. 1. The signals of $\lambda_1 \sim \lambda_4, \lambda_7, \lambda_8$ are received from node 2, $\lambda_3$ and $\lambda_4$ from node 3, and $\lambda_3 \sim \lambda_8$ from 6. The signals of $\lambda_1 \sim \lambda_6$ generated from node 1 are added to the optical cross-connect. Transmission link module connected to node 2 selects signals of $\lambda_1 \sim \lambda_4, \lambda_7, \lambda_8$ and transmits it to node 2 through output fiber port in order to establish optical paths between node 2 and other nodes.

Input and added signals are supplied to transmission link modules and drop link module through optical power splitters. The transmission link module connected to node 2 through output fiber port, it selects signal of $\lambda_4$ out of $\lambda_3, \lambda_4$ received from node 3, signals of $\lambda_3, \lambda_7, \lambda_8$ out of $\lambda_3 \sim \lambda_8$ received from node 6, and signals of $\lambda_1, \lambda_2$ out of $\lambda_1 \sim \lambda_6$ added from node 1. Selected signals of $\lambda_1 \sim \lambda_4, \lambda_7, \lambda_8$ are multiplexed by optical power combiner in the link transmission module and then delivered to node 2 through output fiber ports.

The drop link module in cross-connect at node 1 drops signals selectively of $\lambda_1, \lambda_2$ out of $\lambda_1 \sim \lambda_4, \lambda_7, \lambda_8$ received from node 2, $\lambda_3$ out of $\lambda_3$ and $\lambda_4$ received from node 3, and $\lambda_4 \sim \lambda_6$ out of $\lambda_3 \sim \lambda_8$ received from node 6.

As stated above, transmission link modules 321, 322, 323 receive multiplexed signals as input, select signals to be transmitted to particular node, and generate multiplexed signals as output. For doing this, as shown in FIG. 4a, Each routing module 411, 412, 413 in transmission link modules 321, 322, 323 selects signals to be transmitted to link module outlet out of input signals. Selected signal are multiplexed by optical power combiner 421 and transmitted to outlet of the transmission link module as output.

Drop link module 331 receives multiplexed signals as input and drops signals selectively to be dropped at the node. For doing this, as shown in FIG. 4b, each routing module 431, 432, 433 in drop link module 331 selects signals to be dropped at the node and transmit them to the outlet of the drop link module. The number of signals can be dropped at the same time is M×N at maximum.

As shown in FIG. 5a, wavelength multiplexed input signals delivered to routing modules 411, 412, 413, 431, 432, 433 are separated as their wavelengths through wavelength demultiplexer 511. The flow of demultiplexed signal is controlled by path module 512 that has switching capability. Control units 514 send out control signals to path modules 512 to pass or block the signals. Then, outputs of path modules 512 are multiplexed by multiplexer 513.

For example, in case of node 1, to provide optical paths for signals to be received from node 3 and node 6 to node 2, a transmission link module connected node 2 selects signal of $\lambda_4$ out of signals of $\lambda_3$ and $\lambda_4$ received from node 3 and signals of $\lambda_3, \lambda_7, \lambda_8$ out of signals of $\lambda_3 \sim \lambda_8$ delivered from node 6. Selected signals are multiplexed by optical power combiner 421 and become output of the transmission link module.

For doing this, demultiplexer in routing module separates multiplexed signals received from node 3 and then signals of $\lambda_3$ and $\lambda_4$ are sent into respective path modules. Control units send pass command to path module that deals with signal of $\lambda_4$ and send block command to path module that deals with signal of $\lambda_3$. Signal of $\lambda_4$ is transmitted to the multiplexer and becomes output of the routing module. Multiplexed input signals supplied from node 6 are also separated as their wavelengths by demultiplexer in another routing module and sent to respective path modules. Control unit sends pass command to path modules that deal with signals of $\lambda_3, \lambda_7, \lambda_8$ and block command to path modules that deal with signals of $\lambda_4, \lambda_5, \lambda_6$. Signals of $\lambda_3, \lambda_7, \lambda_8$ are multiplexed by multiplexer and become output of routing module.

Path modules 512 receive control signals of control unit 514 and perform simple switching function, as shown in FIGS. 5b through 5d. Path modules 512 are implemented by ways such as on/off optical switch 521, tunable fiber grating 541, tunable filter 531.

Figure 6A:
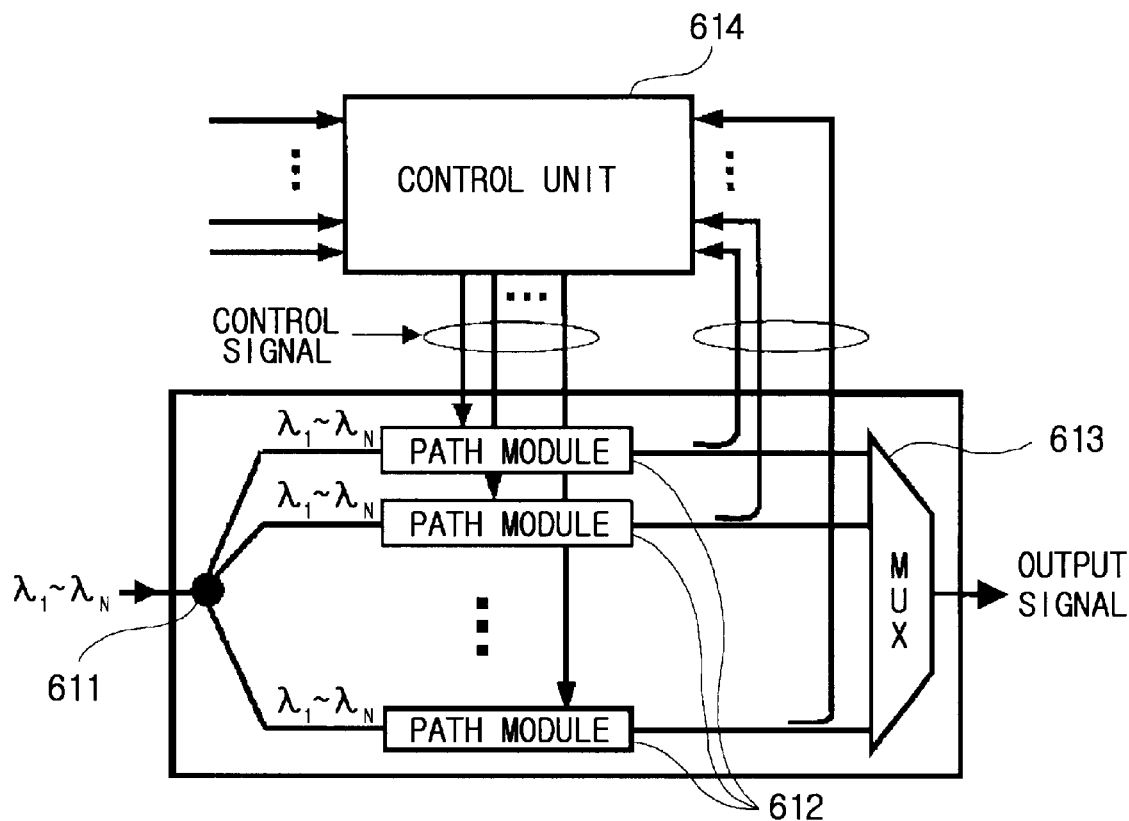
FIG. 6a is the second embodiment of the routing module illustrated in FIGS. 4a and 4b.

FIG. 6a is the second embodiment of the routing module illustrated in FIGS. 4a and 4b. FIGS. 6b through 6e are embodiments of the path module illustrated in FIG. 6a.

As shown in FIG. 6a, multiplexed signals supplied to routing module are distributed to path modules 612 through optical power splitter 611. The flow of signal is controlled by path module 612. Path modules pass signals selectively to be transmitted to the next stage. Control units 614 send control signals to each path module 612 so as to let path modules pass proper signals. Then, outputs of path modules 612 are multiplexed by multiplexer 613.

Routing module in FIG. 6a is an implementation when optical power splitter 611 replaces demultiplexer 511. The difference is that in routing module of FIG. 5a, path modules 512 performs simple switching function and in routing module of FIG. 6a, path module 612 performs wavelength selection and switching function at the same time. Therefore, path modules depicted in FIGS. 6b through 6e have filtering capability.

Figure 6B:
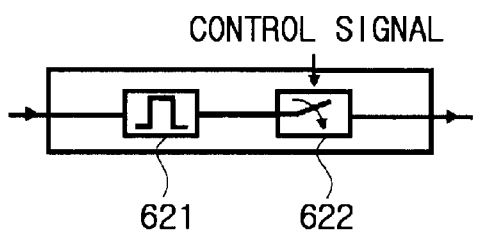
Figure 6C:
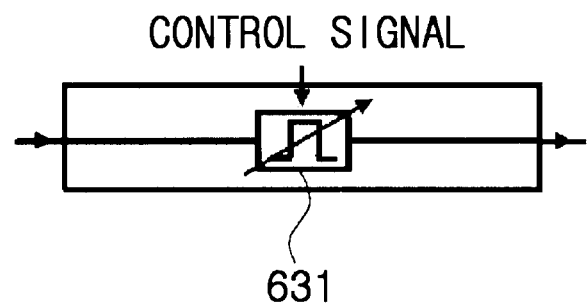
Figure 6D:
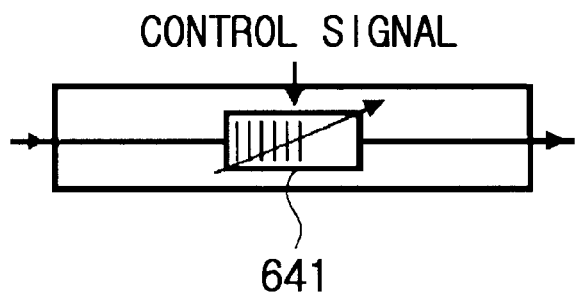

Filter with fixed pass-band 621 followed by on/off optical switch 622 constitutes path module illustrated in FIG. 6b. A signal with particular wavelength out of input signals supplied to path module is selected by the filter and then switch controls flow of the selected signal. In addition, path module 612 can be implemented by tunable filter 631 as shown in FIG. 6c or by tunable optical fiber grating 641 as shown in FIG. 6d.

Figure 6E:
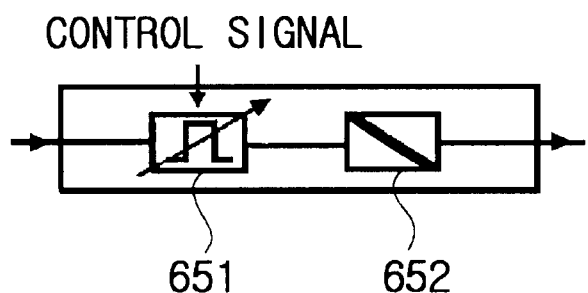

The wavelength interchanging cross-connect can be used to increase wavelength reusability and to enhance restoration capability. The wavelength interchanging cross-connect is implemented by tunable filter 651 followed by fixed wavelength converter 652 as shown in FIG. 6e.

Figure 7A:
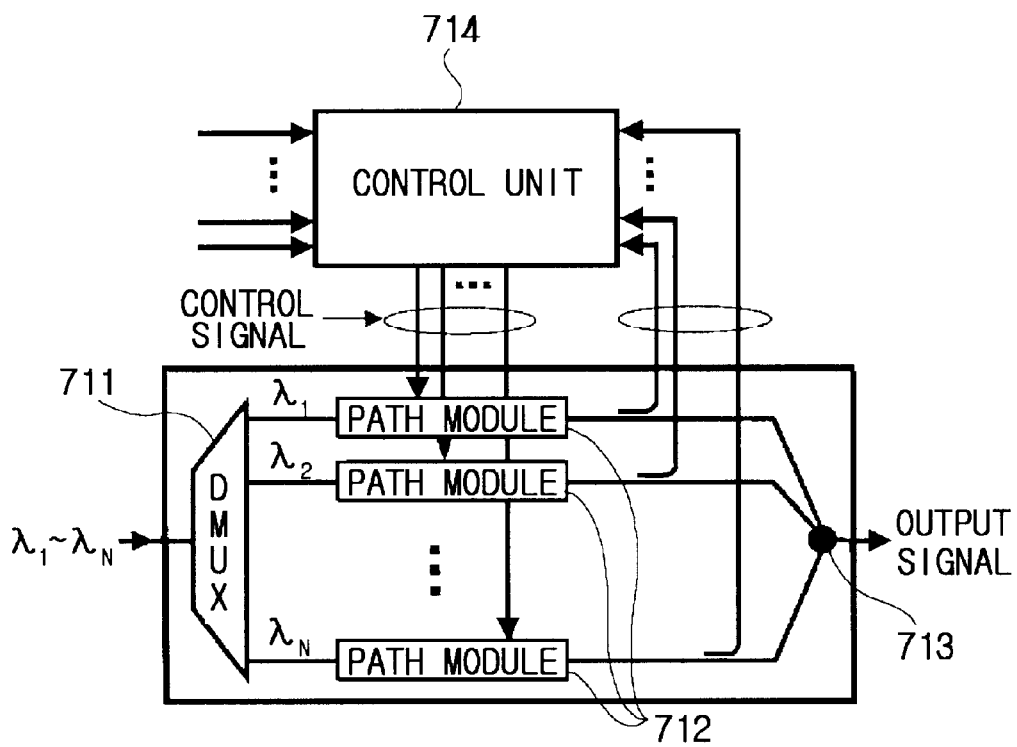
FIG. 7a is the third embodiment of the routing module illustrated in FIGS. 4a and 4b.
Figure 7B:
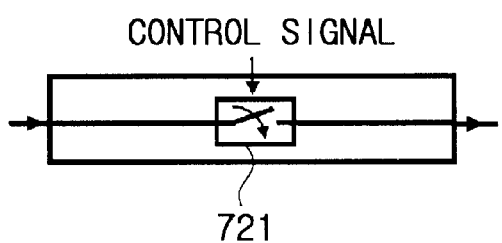
Figure 7C:
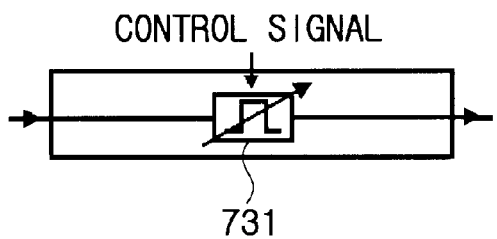
Figure 7D:
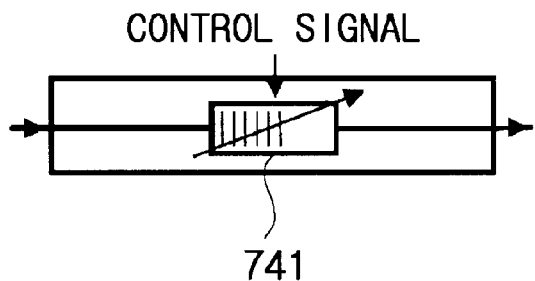

FIG. 7a is the third embodiment of the routing module illustrated in FIGS. 4a and 4b. FIGS. 7b through FIG. 7g are embodiments of path module.

As shown in FIG. 7a, multiplexed signals supplied to routing modules are demultiplexed by demultiplexer 711 and then are supplied to path modules 712. The flow of demultiplexed signal is controlled by path module 712. Control units 714 send control signals to path modules 712. Then, outputs of path modules 712 are multiplexed by optical power combiner 713.

Figure 7E:
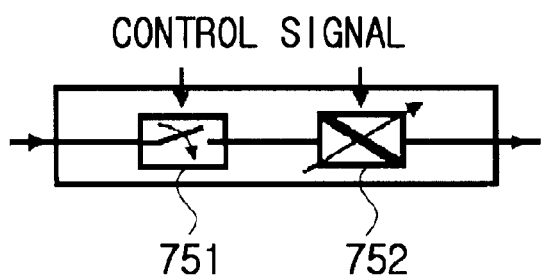
Figure 7F:
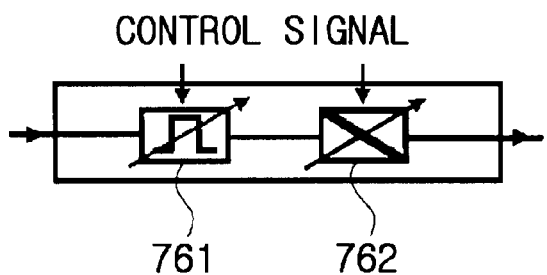
Figure 7G:
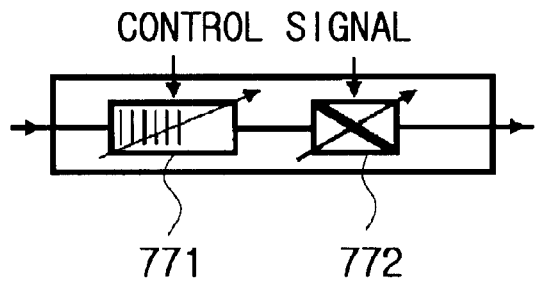

Routing module in FIG. 7a is an implementation that has optical power combiner 713 instead of multiplexer 513 of routing modules used in FIG. 5a. Path module 712 in routing module is implemented by on/off optical switch 721, tunable filter 731 and optical fiber grating 741. In addition, in order to implement wavelength interchanging cross-connect, tunable wavelength converter 752, 762, 772 that converts wavelength of input signals, as shown in FIG. 7e and 7g, is added to path modules 712.

Figure 8A:
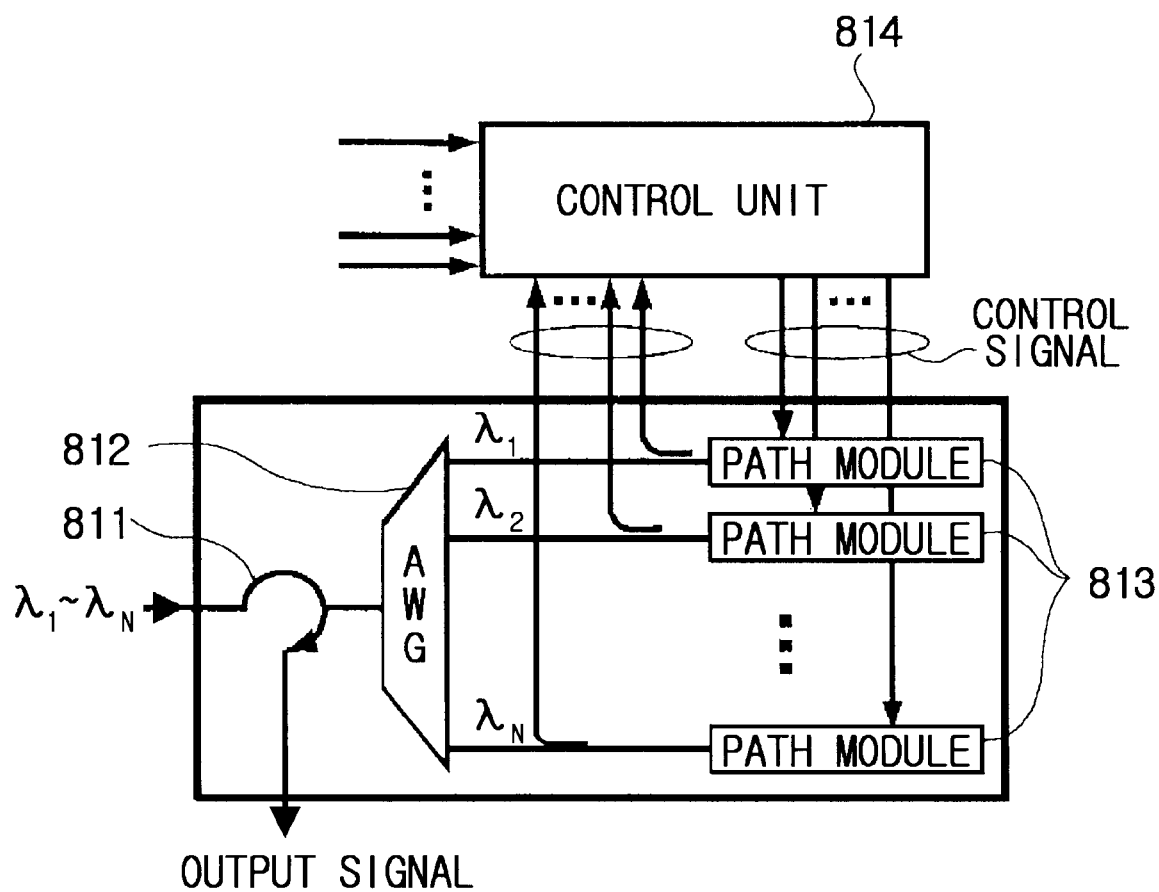
FIG. 8a is the fourth embodiment of the routing module illustrated in FIGS. 4a and 4b.

FIG. 8a is the fourth embodiment of the routing module illustrated in FIGS. 4a and 4b and FIG. 8b, FIG. 8c, and FIG. 8d are embodiments of path module illustrated in FIG. 8a.

As shown in FIG. 8a, wavelength multiplexed input signals supplied to routing module are sent to AWG (arrayed waveguide grating) 812 through optical circulator 811. The AWG separates multiplexed signals by wavelength and then each path module 813 reflects or blocks separated signals by switching. Control unit 814 controls switching operation of path modules 813 by sending corresponding control signals. Reflected signals by path module 813 are multiplexed through AWG 812 and then sent out as output of routing module through optical circulator 811.

Routing module that is different from previously stated ones is implemented by reflection routing module. While path module passes signal with selected wavelength and blocks the other signals in previous embodiments, path module 813 in this embodiment reflects signal with selected wavelength to AWG 812 and blocks the other signals.

The AWG 812 demultiplexes input signals supplied from optical circulator 811 and then path modules reflect signals selectively to be returned to the AWG 812. The AWG 812 multiplexes selected signals and makes output of routing module through optical circulator 811.

Figure 8B:
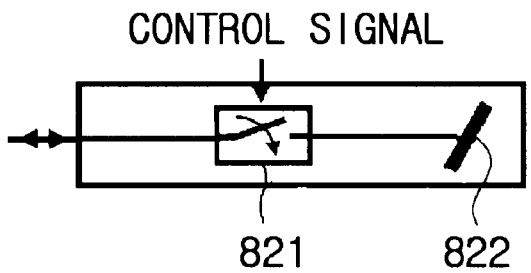
Figure 8C:
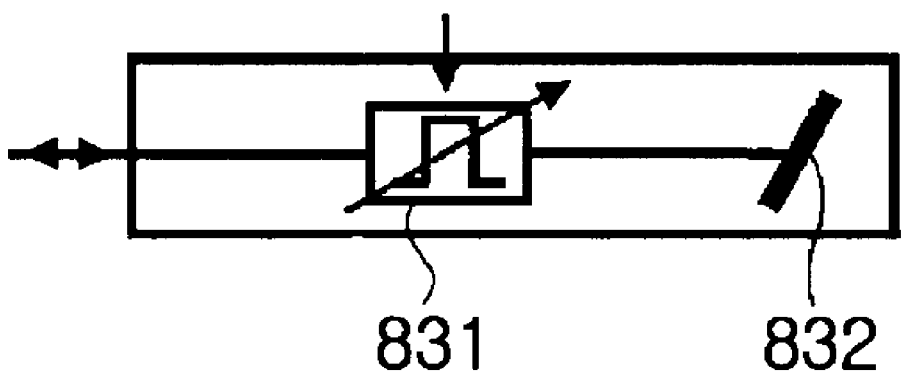
Figure 8D:
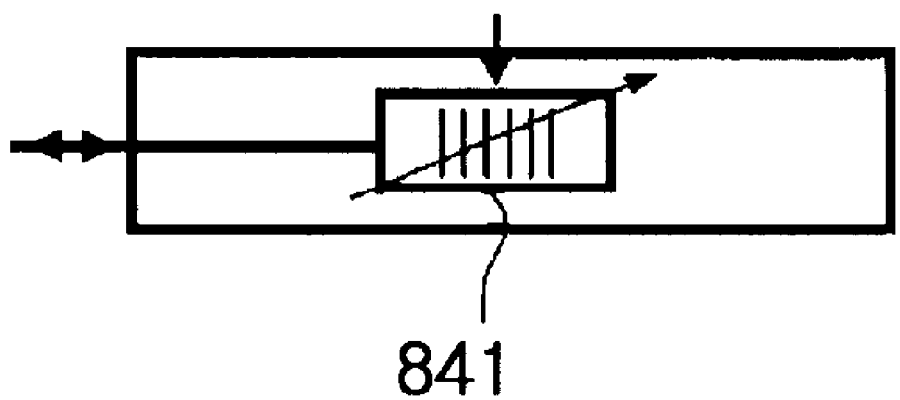

FIG. 8b shows a path module implemented by an on/off optical switch 821 and a reflector 822 that reflects signals to AWG 812. FIG. 8c shows a path module implemented by a tunable filter 831 and a reflector that reflects signals to AWG 812. FIG. 8d shows a routing module implemented by tunable optical fiber grating 841.

The present invention divides the internal structure of optical cross-connect into 3 layers and constitutes modules at layer level. Multicast-capable optical cross-connect with layered modularity is composed of link modules that select signals to be delivered to a particular output fiber port. Each link module is composed of routing modules that deals with input signals from a particular input fiber port and each routing module is composed of path modules that deal with signals of particular wavelength.

By excellent modularity, the present invention provides efficient ways to prepare network evolution and to upgrade node system economically and to minimize service suspension due to network repair. In each path module, because switching time is short and switching control is simple, it needs less amount of time for trouble shooting than previously developed optical cross-connect.

Since the present invention is capable to connect input signals from single input fiber port to multiple output fiber ports and drop all input signals at the same time, its adaptability to different network structure is extensive.

Although the preferred embodiments of the present invention have been disclosed for illustrative purpose, those who are skilled in the art will appreciate that various modifications, additions and substitutions are possible without departing from the scope and spirit of the present invention as defined in the accompanying claims.

What is claimed is:

1. An optical cross-connect system for establishing connections between M+m input fiber ports and 2M output fiber ports, where M and m are positive integers, comprising:

M+m 1×M optical power splitters, said optical power splitters connected to said input fiber ports and distributing input signals;

a drop link module for selecting signals to be dropped at the node where said optical cross-connect is installed; and M transmission link modules for selecting signals to be transmitted to a particular output fiber port among input signals.

2. The optical cross-connect system according to claim 1, wherein said transmission link module comprises:

M+m−1 routing modules for selecting signals to be transmitted to the output fiber port from a particular input fiber port; and a (M+m−1)×1 optical power combiner for combining output signals of said routing modules and supplying combined signals to said output fiber port, whereby said drop link module comprises M routing modules for selecting signals to be dropped among input signals supplied through said M input fiber ports.

3. The optical cross-connect system as claimed in claim 2, wherein said routing module comprises:

a 1×N demultiplexer for demultiplexing wavelength multiplexed input signals by wavelength, where N is a positive integer;

N path modules for controlling flow of signals demultiplexed by said demultiplexers;

a N×1 multiplexer for multiplexing output signals of said path modules; and a control unit for controlling operation of said path modules.

4. The optical cross-connect system according to claim 3, wherein said path module is an on/off optical switch.

5. The optical cross-connect system according to claim 3, wherein said path module is a tunable filter.

6. The optical cross-connect system according to claim 3, wherein said path module is a tunable fiber grating.

7. The optical cross-connect system according to claim 2, wherein said routing module comprises:

a 1×N optical power splitter for distributing wavelength multiplexed input signals;

N path modules for selecting signal of particular wavelength among input signals and controlling its flow;

a N×1 multiplexer for multiplexing output signals of said path modules; and a control unit for controlling operation of said path modules.

8. The optical cross-connect system according to claim 7, wherein said path module comprises a fixed filter and an on/off optical switch.

9. The optical cross-connect system according to claim 7, wherein said path module is a tunable filter.

10. The optical cross-connect system according to claim 7, wherein said path module is a tunable fiber grating.

11. The optical cross-connect system according to claim 7, wherein said path module comprises a tunable filter and a fixed wavelength converter.

12. The optical cross-connect system according to claim 2, wherein said routing module comprises:

a 1×N demultiplexer for demultiplexing wavelength multiplexed input signals by wavelength;

N path modules for controlling flow of signals demultiplexed by said demultiplexer;

a N×1 optical power combiner for multiplexing output signals of said path modules; and a control unit for controlling operation of said path modules.

13. The optical cross-connect system according to claim 12, wherein said path module is an on/off optical switch.

14. The optical cross-connect system according to claim 12, wherein said path module is a tunable filter.

15. The optical cross-connect system according to claim 12, wherein said path module is a tunable fiber grating.

16. The optical cross-connect system according to claim 12, wherein said path module is added by a tunable wavelength converter, said tunable wavelength converter converting wavelength of signals passed through an on/off optical switch, a tunable filter, or a tunable fiber grating.

17. The optical cross-connect system according to claim 2, wherein said routing module comprises:

a 1×N arrayed waveguide grating (AWG) for demultiplexing signals from optical circulators and multiplexing signals from path modules;

an optical circulator for connecting output signals of said AWGs to said output fiber ports;

N path modules for controlling flow of signals from said AWG by reflecting signals selectively into AWG; and a control unit for controlling operation of said path modules.

18. The optical cross-connect system according to claim 17, wherein said path module comprises an on/off optical switch and a reflector.

19. The optical cross-connect system according to claim 17, wherein said path module comprises a tunable filter and a reflector.

20. The optical cross-connect system according to claim 17, wherein said path module is tunable fiber grating.

* * * * *